United States Patent
Ozaki

(10) Patent No.: US 8,843,291 B2
(45) Date of Patent: Sep. 23, 2014

(54) ELECTRIC VEHICLE

(75) Inventor: Takayoshi Ozaki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/003,346

(22) PCT Filed: Mar. 5, 2012

(86) PCT No.: PCT/JP2012/055531
§ 371 (c)(1),
(2), (4) Date: Sep. 5, 2013

(87) PCT Pub. No.: WO2012/121197
PCT Pub. Date: Sep. 13, 2012

(65) Prior Publication Data
US 2013/0345916 A1  Dec. 26, 2013

(30) Foreign Application Priority Data

Mar. 7, 2011 (JP) ................. 2011-048630

(51) Int. Cl.
*B60K 28/16* (2006.01)
*B60K 7/00* (2006.01)
*B60L 3/10* (2006.01)
*B60K 17/04* (2006.01)
*B60L 15/20* (2006.01)

(52) U.S. Cl.
CPC .............. *B60L 15/20* (2013.01); *B60K 7/0007* (2013.01); *B60L 3/104* (2013.01); *B60K 2007/0038* (2013.01); *B60K 17/046* (2013.01); *Y02T 10/7258* (2013.01); *B60L 15/2081* (2013.01); *B60K 2007/0092* (2013.01); *B60L 3/108* (2013.01); *B60L 3/102* (2013.01); *B60L 2220/44* (2013.01); *B60L 3/106* (2013.01)
USPC .......................................... 701/84

(58) Field of Classification Search
None
See application file for complete search history.

(56) References Cited

U.S. PATENT DOCUMENTS

| 4,766,967 | A | * | 8/1988 | Slicker et al. ................ 180/54.1 |
| 5,406,486 | A | * | 4/1995 | Kamio et al. ................... 701/84 |
| 5,867,803 | A | * | 2/1999 | Kim et al. ....................... 701/85 |

(Continued)

FOREIGN PATENT DOCUMENTS

| JP | 2006-258289 | 9/2006 |
| JP | 2008-86160 | 4/2008 |

(Continued)

OTHER PUBLICATIONS

International Search Report mailed May 29, 2012 in corresponding International Application No. PCT/JP2012/055531.

(Continued)

*Primary Examiner* — John R Olszewski
*Assistant Examiner* — Navid Ziaeianmehdizadeh

(57) ABSTRACT

An electric vehicle includes an in-wheel motor drive system. The in-wheel motor drive system includes a wheel bearing unit rotatably supporting a drive wheel, a motor unit, and a reducer unit. The electric vehicle also includes a disturbance observer that determines an estimate of external force influence on the drive wheel. The electric vehicle further includes a slip level-responsive corrector. The slip level-responsive corrector may use the estimate of external force influence, calculate a correction value that may correspond to slip level of the drive wheel, and correct an accelerator signal to the motor unit with the correction value to produce a motor torque command value.

4 Claims, 6 Drawing Sheets

(56) References Cited

U.S. PATENT DOCUMENTS

| | | | |
|---|---|---|---|
| 6,061,622 A * | 5/2000 | Probst | 701/84 |
| 6,182,003 B1 * | 1/2001 | Maier-Landgrebe | 701/84 |
| 7,203,578 B2 * | 4/2007 | Kuang et al. | 701/22 |
| 7,424,359 B2 * | 9/2008 | Fuchs et al. | 701/82 |
| 8,046,124 B2 * | 10/2011 | Muta et al. | 701/22 |
| 8,335,625 B2 * | 12/2012 | Yamaguchi et al. | 701/82 |
| 2003/0171869 A1 * | 9/2003 | Potter et al. | 701/84 |
| 2004/0176899 A1 * | 9/2004 | Hallowell | 701/84 |
| 2005/0080547 A1 * | 4/2005 | Scelers et al. | 701/82 |
| 2006/0237244 A1 * | 10/2006 | Hommi | 180/65.2 |
| 2008/0234911 A1 * | 9/2008 | Matsuno et al. | 701/82 |
| 2009/0101428 A1 * | 4/2009 | Itoh | 180/197 |
| 2009/0210128 A1 * | 8/2009 | Fujimoto et al. | 701/84 |
| 2010/0094495 A1 * | 4/2010 | Fujimoto et al. | 701/22 |
| 2011/0288702 A1 * | 11/2011 | Falkestein | 701/22 |

FOREIGN PATENT DOCUMENTS

| | | |
|---|---|---|
| JP | 2008-172935 | 7/2008 |
| JP | 2009-55703 | 3/2009 |
| JP | 2010-51160 | 3/2010 |

OTHER PUBLICATIONS

PCT International Preliminary Report on Patentability mailed Sep. 19, 2013 in corresponding International Application No. PCT/JP2012/055531.

U.S. Appl. No. 14/003,350, filed Sep. 5, 2013, Takayoshi Ozaki, NTN Corporation.

\* cited by examiner

US 8,843,291 B2

ELECTRIC VEHICLE

CROSS REFERENCE TO THE RELATED APPLICATIONS

This application is a U.S. national stage application of PCT/JP2012/055531, filed Mar. 5, 2012, and is based on and claims the foreign priority benefit of a Japanese patent application No. 2011-048630, filed Mar. 7, 2011, the entire disclosure of both of which are herein incorporated by reference as a part of this application.

BACKGROUND OF THE INVENTION

1. Field of the Invention

The present invention relates to an electric vehicle that includes an in-wheel motor drive system. The electric vehicle may be battery-powered or fuel cell-powered.

2. Description of Related Art

A motor used in an electric vehicle may be superior to an internal combustion engine in terms of response characteristics. In an in-wheel motor electric vehicle, each wheel may be provided with such a highly responsive motor that operates independently of other motor(s).

[Patent Document 1] JP Laid-open Patent Publication No. 2008-172935

SUMMARY OF THE INVENTION

As noted above, an electric vehicle may include highly responsive motor(s). However, such highly responsive motor(s) may undesirably cause sudden increase of rotation of tire(s) when the tire(s) lose(s) contact with a road surface due to, for example, slip of the tire(s). In such a situation, an effective braking operation may be difficult. Hence, sudden increase of rotation of a motor that may occur in response to slip may jeopardize the stable travel of a vehicle. In an in-wheel motor electric vehicle, each wheel may be driven independently of other wheel(s). Thus, an in-wheel motor electric vehicle may need to minimize such sudden increase of rotation of motor(s) that may occur in response to the slip of drive wheel(s) associated with the motor(s). In order to address this, it may be contemplated to determine slip level to correct a torque command value and send a corrected torque command value to the motor(s). However, conventional methods of determining slip level may not be suitable for such an application. Moreover, simply determining slip level to correct a torque command value may not produce a properly corrected torque command value, because of the presence of external force influence, such as due to winds or vehicle weight when going up a slope.

An object of the present invention is to provide an electric vehicle that can properly prevent possible slip of tire(s) while taking into account external force influence, such as due to winds or vehicle weight when going up a slope, and that can ensure such prevention of possible slip without having to undesirably hinder the travel performance of the vehicle to prevent such slip.

The present invention may provide an electric vehicle which includes an in-wheel motor drive system 8. The in-wheel motor drive system 8 includes a wheel bearing unit 4 rotatably supporting a drive wheel 2, a motor unit 6, and a reducer unit 7 interposed between the motor unit 6 and the wheel bearing unit 4. The electric vehicle also includes a disturbance observer 43 that determines an estimate ^Te of external force influence on the drive wheel 2. The electric vehicle further includes a slip level-responsive corrector 44.

The slip level-responsive corrector 44: (i) uses the estimate ^Te of external force influence to calculate an estimate of torque applied to the drive wheel 2, an estimate ^ω2 of rotational frequency of the drive wheel 2, and an estimate ^•ω of rotational angular acceleration of the drive wheel 2; (ii) determines an estimate of slip level of a tire based on comparison between the estimate ^ω2 and an actual rotational frequency ω2 of the drive wheel 2 and comparison between the estimate ^•ω and an actual rotational angular acceleration •ω2 of the drive wheel 2; (iii) calculates a correction value Tc based on the estimate of slip level; and (iv) corrects an accelerator signal Tr to the motor unit with the correction value Tc to produce a motor torque command value Tmr.

The disturbance observer 43 is configured to: (a) divide the motor torque command value Tmr by a moment J of inertia of the drive wheel that is estimated based on inertia of the vehicle, to produce a quotient; (b) calculate an integral ^ω1 of the quotient; (c) calculate a difference between the integral ^ω1 and a rotational frequency ω1 of a driven wheel; (d) calculate a time derivative of the difference; and (e) multiply the time derivative with the moment J of inertia to produce the estimate ^Te of external force influence on the drive wheel.

The slip level-responsive corrector 44 is configured to: (a) add the estimate ^Te of external force influence and the motor torque command value Tmr to produce a sum; (b) divide the sum by the moment J of inertia of the drive wheel that is estimated based on inertia of the vehicle, to produce a quotient; (c) calculate an integral ^ω2 of the quotient; and (d) calculate a difference between the integral ^ω2 and a rotational frequency ω2 of the drive wheel, as speed difference, or is configured to: (a) add the estimate ^Te of external force influence and the motor torque command value Tmr to produce a sum; (b) divide the sum by the moment J of inertia of the drive wheel that is estimated based on inertia of the vehicle, to produce a quotient ^•ω2; (e) calculate a difference between the quotient ^•ω2 and a time derivative •ω2 of a rotational frequency ω2 of the drive wheel, as acceleration difference. The slip level-responsive corrector 44 is further configured to subtract from the accelerator signal Tr, a signal Tc that is proportional to the speed difference, a signal Tc that is proportional to the acceleration difference, or a signal Tc that is proportional to a value equal to one of the speed difference and the acceleration difference as corrected with the other of the speed difference and the acceleration difference, to produce the motor torque command value Tmr.

The phrase "rotational frequency" used herein is equivalent to the number of revolutions per unit time, i.e., rotational speed. A moment J of inertia of a/the drive wheel that is estimated based on inertia of the vehicle may depend on vehicle mass and the number of wheels.

In the aforementioned configuration, the disturbance observer 43 may: divide a motor torque command value Tmr by a moment J of inertia of the drive wheel 2 to produce a quotient; calculate an integral ^ω1 of the quotient; calculate a difference between the integral ^ω1 and a rotational frequency ω1 of a driven wheel; calculate a time derivative of the difference; and multiply the time derivative with the moment J of inertia to produce an estimate ^Te of external force influence on the drive wheel 2. Such an integral ^ω1 of a quotient produced by division of a motor torque command value Tmr by a moment J of inertia of the drive wheel 2 corresponds to an estimate ^ω1 of rotational frequency of a driven wheel when the vehicle is traveling on level ground. Thus, in the aforementioned configuration, an estimate ^ω1 of rotational frequency of a driven wheel when the vehicle is traveling on level ground is compared with an actually obtained rotational frequency ω1 of the driven wheel, thereby allowing for providing an estimate ^Te of external force influence that may occur, for example, when going up a slope.

Note that the travel of a vehicle causes the rotation of driven wheel(s) 3. Hence, a rotational frequency of a driven wheel can be considered as a travel speed of the vehicle.

The slip level-responsive corrector 44 may, for example: add the estimate ^Te of external force influence, as determined by the disturbance observer 43 in the aforementioned manner, and the motor torque command value Tmr to produce a sum; divide the sum by the moment J of inertia of the drive wheel, to produce a quotient; calculate an integral ^ω2 of the quotient; and calculate a difference between the integral ^ω2 and a rotational frequency ω2 of the drive wheel, as speed difference. Such an integral ^ω2 of the quotient corresponds to an estimate of rotational frequency of the drive wheel when there is no occurrence of slip. Advantageously, the estimate takes external force influence into account. The difference between such an estimate ^ω2 of rotational frequency of the drive wheel and an actually obtained rotational frequency ω2 of the drive wheel 2 corresponds to an estimate of slip level of the drive wheel 2. Such an estimate of slip level advantageously takes external force influence into account, thus being a highly precise estimate.

A value Tc that is proportional to an estimate of slip level of the drive wheel 2 calculated in the aforementioned manner, may be subtracted from an accelerator signal Tr, to produce a motor torque command value Tmr. In this way, possible slip of tire(s) can be properly prevented while taking into account external force influence, such as due to winds or vehicle weight when going up a slope, and such prevention of possible slip can be ensured without having to undesirably hinder the travel performance of the vehicle to prevent such slip.

In the example as just discussed, the slip level-responsive corrector 44 performs correction based on comparison between an estimate ^ω2 and an actually obtained value ω2 of rotational frequency of the drive wheel 2. On the other hand, the slip level-responsive corrector 44 may perform correction based on comparison between an estimate ^•ω2 and an actually obtained value ^•ω2 of angular acceleration of the drive wheel 2. In the latter case, too, possible slip can be properly prevented.

The slip level-responsive corrector 44 may perform correction based on both of (i) the difference between an estimate and an actually obtained value of rotational frequency of the drive wheel 2; and (ii) the difference between an estimate and an actually obtained value of angular acceleration of the drive wheel 2. In this case, possible slip can be even more properly prevented.

In the present invention, the in-wheel motor drive system 8 may be partly or entirely disposed within the drive wheel 2 and may include the motor unit 6 and the wheel bearing unit 4. The in-wheel motor drive system 8 may also include the reducer unit 7 configured to transmit to the drive wheel 2 rotation with a speed that is reduced with respect to that of rotation of the motor unit 6.

In an electric vehicle with an in-wheel motor drive system 8, each drive wheel 2 may be driven, independently of other drive wheel(s) 2, with a highly responsive motor unit 6. Thus, the stable travel of such a vehicle may considerably depend on whether appropriate control of the drive wheel(s) 2 can be performed responsively to slip when detected. With the present invention, possible slip of tire(s) equipped to the corresponding drive wheel(s) 2 can be properly prevented, regardless of, for example, various road conditions, thus effectively preventing a slip of the vehicle itself.

A configuration where the in-wheel motor drive system 8 is at least partly disposed within a drive wheel 2 can reduce the extension of the in-wheel motor drive system 8 along an axis of the corresponding drive wheel 2. A configuration where the in-wheel motor drive system 8 includes a reducer unit 7 configured to transmit to a drive wheel 2 rotation with a speed that is reduced with respect to that of rotation of the motor unit 6 allows for the provision of a smaller motor unit 6.

In the present invention, the reducer unit 7 may comprise a cycloidal reducer. A cycloidal reducer can achieve a significant reduction ratio that may reach 1/10 or greater and can also realize a smoother operation. Such a significant reduction ratio allows for the provision of a smaller motor unit 6 that generates rapid rotation, thus enabling weight reduction of the vehicle. In a configuration where a reducer unit comprises a reducer with a significant reduction ratio, such as a cycloidal reducer, the torque generated by a motor unit may be transmitted in correspondingly amplified form to a tire. Thus, in such a configuration, a motor unit may generate a drive torque that has more impact on slip level. Prevention of possible slip according to the present invention can be more effective in such a configuration.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF THE EMBODIMENTS

Figure 1:
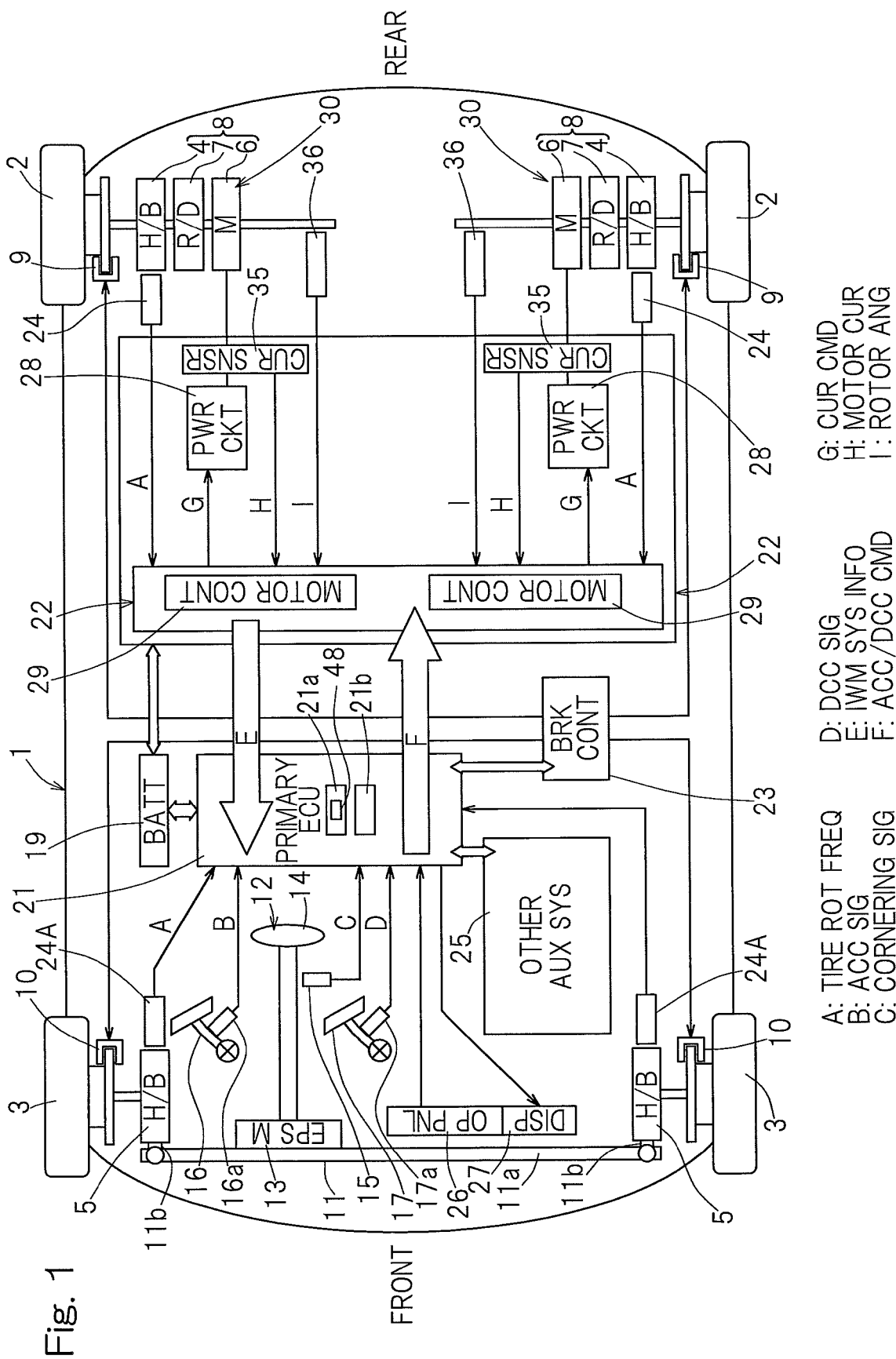
FIG. 1 is a block diagram of a schematic configuration of an electric vehicle, as viewed from top, according to an embodiment of the present invention.

An embodiment of the present invention will now be described in connection with FIG. 1 to FIG. 7. The illustrated electric vehicle is a four-wheel vehicle such as shown in FIG. 1 that includes a vehicle body 1 with left and right rear wheels and left and right front wheels, with the rear wheels being drive wheels 2 and the front wheels being steered driven wheels 3. The drive wheels 2 and the driven wheels 3, both equipped with tires, are supported by the vehicle body 1 via respective wheel bearing units 4, 5. In FIG. 1, the wheel bearing units 4, 5 are labeled with "H/B" which is an abbreviation for hub bearing. The left and right drive wheels 2, 2 are driven by respective independent, highly responsive traction motor units 6, 6. Rotation of a motor unit 6 is transmitted via a reducer unit 7 and a wheel bearing unit 4 to a wheel 2. The motor unit 6, the reducer unit 7 and the wheel bearing unit 4 are integrally assembled with each other to form an in-wheel motor drive system 8.

Figure 2:
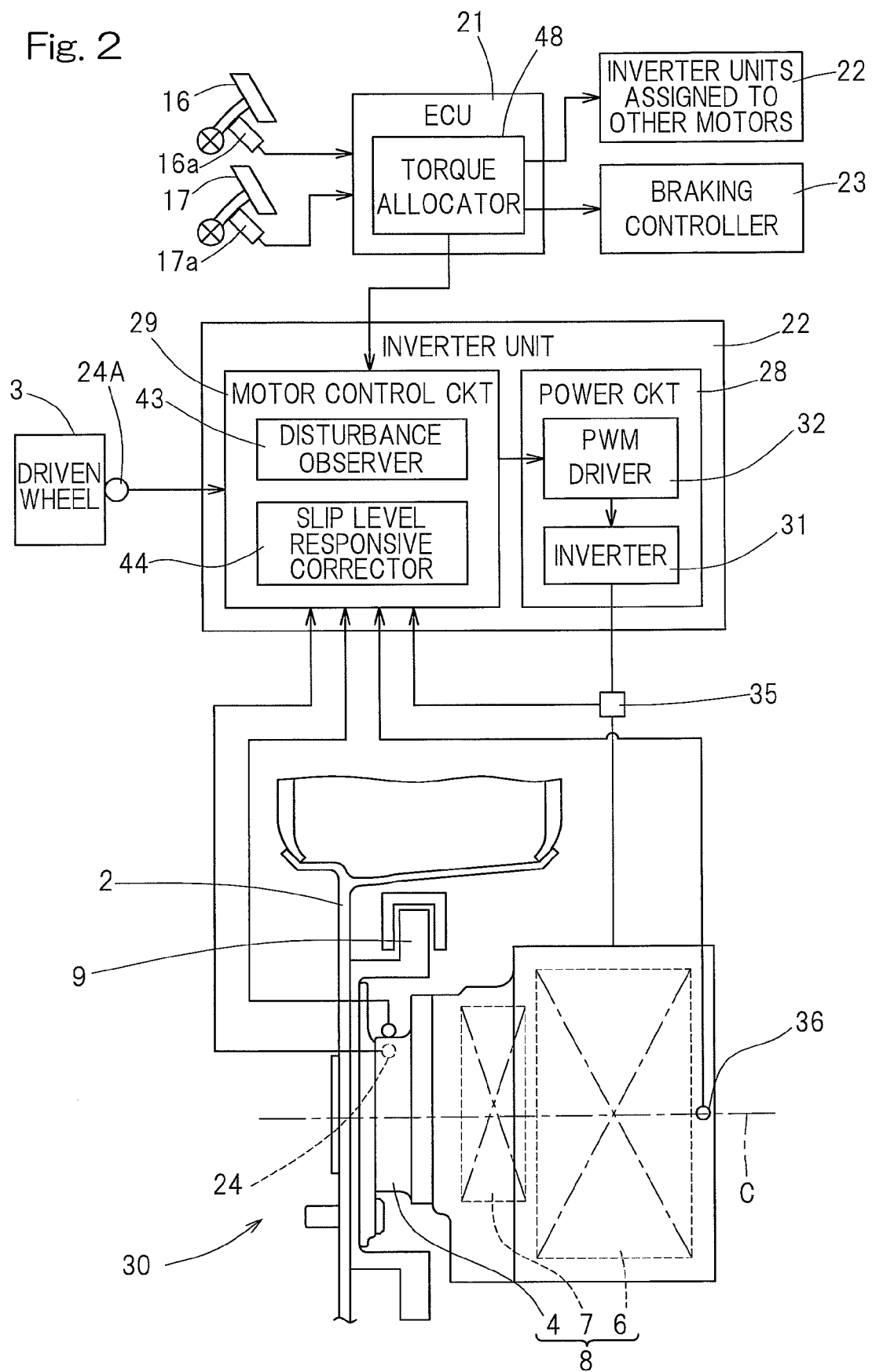
FIG. 2 is a block diagram of a schematic configuration of an in-wheel motor unit for the electric vehicle.

The in-wheel motor drive system 8 as shown in FIG. 2 is partly or entirely disposed within the drive wheel 2. In the embodiment under discussion, a drive wheel 2 extends along an axis C of the drive wheel 2, so as to overlap with the entirety of the wheel bearing unit 4, the entirety of the reducer unit 7 and part of the motor unit 6. In a variant, a drive wheel 2 may extend along an axis of the drive wheel 2, so as to overlap with entirety of the in-wheel motor drive system 8. The motor unit 6 may, without the interposition of the reducer unit 7, directly drive a drive wheel 2 into rotation. Each in-wheel motor drive system 8, together with an inverter unit 22 which will be discussed later in connection with FIG. 1, forms an in-wheel motor unit 30. The drive wheels 2 and the driven wheels 3 are equipped with respective electrically driven mechanical friction brakes 9, 10.

The left and right front steered driven wheels 3, 3 are turnable via a turning mechanism 11 and are steered with a steering mechanism 12. The turning mechanism 11 includes left and right knuckle arms 11b, 11b holding the respective wheel bearing units 5 and also includes a tie rod structure 11a configured to be laterally displaced to change the angles of the left and right knuckle arms 11b, 11b. The lateral movement of the turning mechanism 11 may be caused by a command from the steering mechanism 12, which drives an EPS (Electric Power Steering) motor 13, and via a rotary to linear motion converter mechanism (not shown). A steering angle sensor 15 is configured to sense a steering angle. The output of the steering angle sensor 15 is sent to the ECU 21 in which the sensed information may be used to generate an accelerating/decelerating command for left and right drive wheels 2, 2.

A control system will be briefly discussed. The illustrated vehicle body 1 is equipped with an ECU 21 which is a primary electronic control unit configured to perform general control of the vehicle, an inverter unit 22 configured to perform control of the traction motor units 6 according to commands from the ECU 21, and a braking controller unit 23. The ECU 21 may include a computer, programs that may be executed by the computer, and various electronic circuits.

The ECU 21 may be generally divided, in terms of their functions, into a drive control subunit 21a that performs drive-related controls and a general control subunit 21b that performs other controls. The drive control subunit 21a may include a torque allocator 48 that is configured to generate an accelerating/decelerating command in the form of a torque command value, which will influence the traction motor units 6, 6 of the left and right wheels, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. The torque allocator 48 may be configured to, in response to a decelerating signal produced from the brake manipulation unit 17, generate a braking torque command allocated to regenerative braking of the motor unit 6 and a braking torque command allocated to the operation of the mechanical brakes 9, 10. The braking torque command allocated to regenerative braking is taken into account in the generation of the accelerating/decelerating command in the form of a torque command value, which will influence the traction motor units 6, 6 of the left and right drive wheels 2, 2. The braking torque command allocated to the operation of the mechanical brakes 9, 10 is sent to the braking controller unit 23.

In addition, the torque allocator 48 may be configured to correct the accelerating/decelerating command, based on information indicating the rotational frequency of tires produced from rotation sensors 24, 24A that are operatively associated with the wheel bearing units 4, 5 for the respective wheels 2, 3 and/or information produced from various sensors that may be mounted to the vehicle. The accelerator manipulation unit 16 includes an accelerator pedal and a sensor 16a configured to sense the depression of the accelerator pedal to generate the aforementioned accelerating signal. The brake manipulator unit 17 includes a brake pedal and a sensor 17a configured to sense the depression of the brake pedal to generate the aforementioned decelerating signal.

The general control subunit 21b of the ECU 21 is configured to control various auxiliary systems 25, process input signals from an operation panel 26 on a console, cause a display 27 to show information, and/or etc. Examples of the auxiliary systems 25 include an air conditioner, a lamp, a wiper, a GPS, and an airbag. In FIG. 1, the auxiliary systems 25 are indicated in general by a single block.

The braking controller unit 23, which may include electronic circuits and/or a microcomputer, is configured to send a braking command to the mechanical brakes 9, 10 equipped to the drive wheels 2, 2 and driven wheels 3, 3, respectively, according to commands related to braking received from the ECU 21. Commands related to braking produced from the primary ECU 21 may include, other than commands generated based on the decelerating signal produced from the brake manipulator unit 17, a command generated by a safety enhancement subunit that may be included in the ECU 21. The braking controller unit 23 may also include an anti-lock-braking system.

The inverter unit 22 includes a power circuitry 28, which may be provided one for each of the motor units 6, and a motor control circuitry 29 configured to control the power circuitry/circuitries 28. A common motor control circuitry 29 may be provided for different power circuitries 28. Independent motor control circuitries 29 may be provided for respective different power circuitries 28. Such a common motor control circuitry 29 will be configured to control the different power circuitries 28 independently of each other, for example, to achieve different motor torques. The motor control circuitry 29 may be configured to send various information related to the in-wheel motor drive system 8 (which may be referred to as "IWM system information") held by the motor control circuitry 29, such as a variety of detected values or various control values, to the ECU 21.

In the embodiment under discussion, the motor control circuitry 29 is provided one for each power circuitry 28. Furthermore, an inverter unit 22 which includes one motor control circuitry 29 and one power circuitry 28, together with an in-wheel motor drive system 8 which includes a motor unit 6 that can be controlled by the inverter unit 22, forms the aforementioned in-wheel motor unit 30.

FIG. 2 is a block diagram of a schematic configuration of the in-wheel motor unit 30. The power circuitry 28 of the illustrated inverter unit 22 includes an inverter 31 configured to convert a DC power from a battery unit 19 (FIG. 1) into a three-phase AC power used to drive the motor unit 6 and also includes a PWM driver 32 configured to control the inverter 31. The motor unit 6 may include a three-phase synchronous motor such as an IPM (Interior Permanent Magnet) synchronous motor. The inverter 31 may include a plurality of semiconductor switching devices (not shown). The PWM driver 32 may be configured to perform pulse width modulation on a received current command by generating ON/OFF commands to the semiconductor switching devices.

The motor control circuitry 29 may include a computer, programs that may be executed by the computer, and various electronic circuits. The motor control circuitry 29 may be configured to receive the accelerating/decelerating command such as a torque command from the ECU 21 which serves as an upper-level control unit, convert the accelerating/decelerating command into a current command, and send the current command to the PWM driver 32 of the power circuitry 28. The motor control circuitry 29 may be configured to obtain a motor current that flows from the inverter 31 to the motor unit 6, with a current sensor 35, and perform a current feedback control. A rotational angle of a motor rotor in the motor unit 6 may be obtained, with an angle sensor 36, to carry out such a feedback current control based on the obtained rotational angle, such as a vector control.

In the embodiment under discussion, the motor control circuitry 29 includes a disturbance observer 43 and a slip level-responsive corrector 44 as described below. The disturbance observer 43 may determine an estimate of external force influence on the drive wheel 2, such as due to winds or vehicle weight when going up a slope. In other words, the disturbance observer 43 is an external force influence estimator. The slip level-responsive corrector 44 may use the estimate of external force influence as determined by the disturbance observer 43 to calculate a correction value that may correspond to slip level of the drive wheel 2, and correct an accelerator signal to the motor unit 6 with the correction value to produce a motor torque command value.

Figure 3:
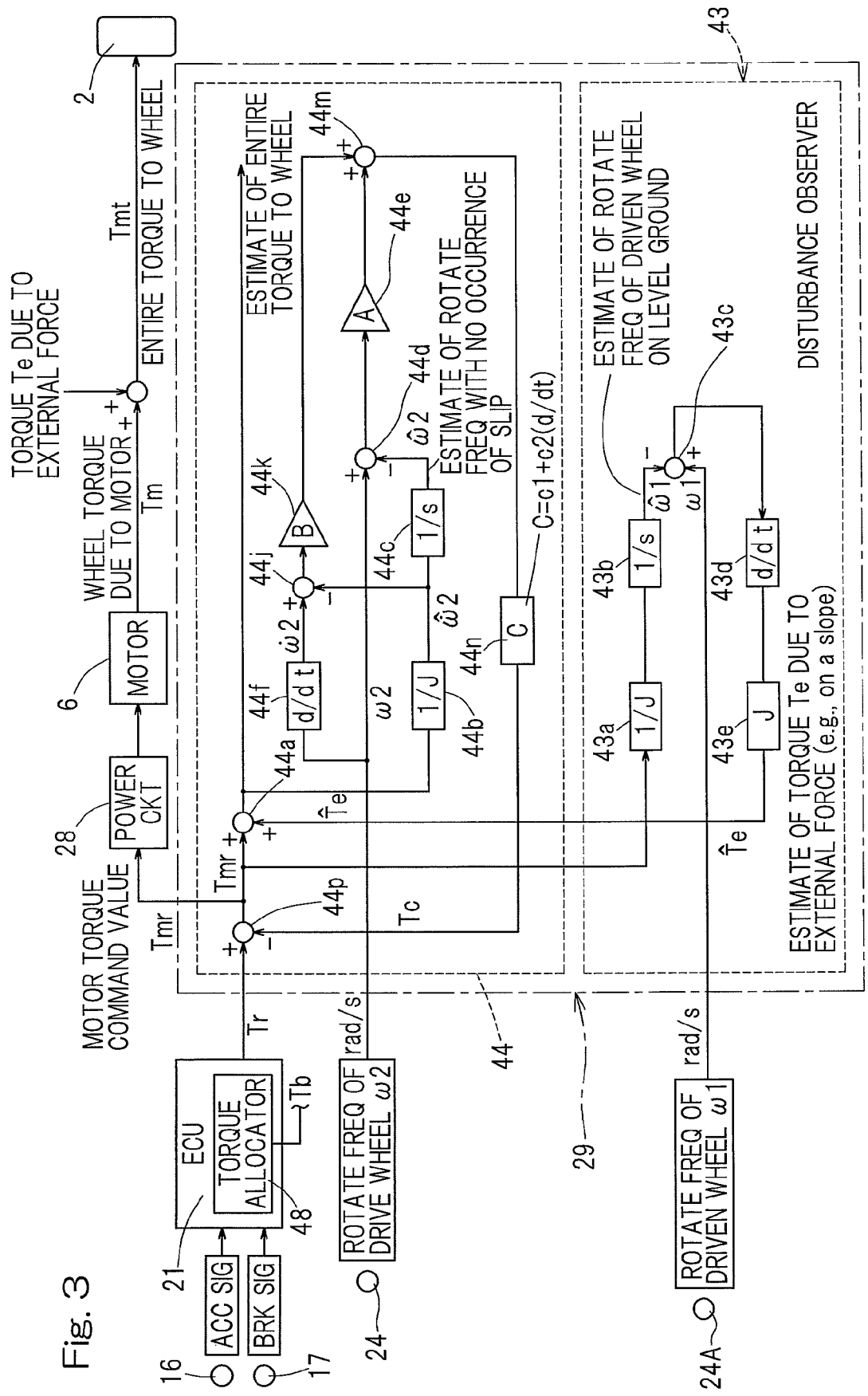
FIG. 3 is a block diagram of a schematic configuration of a motor control circuitry for the electric vehicle.

Particular configurations that the disturbance observer 43 and the slip level-responsive corrector 44 may take will now be discussed in connection with FIG. 3. The illustrated disturbance observer 43 includes an inertia divider 43a, an integrator 43b, a calculator 43c, a time differentiator 43d, and an inertia multiplier 43e. In the disturbance observer 43, the inertia divider 43a may be configured to divide a motor torque command value Tmr by a moment J of inertia of a drive wheel that is estimated based on inertia of the vehicle, to produce a quotient. The integrator 43b may be configured to calculate an integral of the quotient. Such an integral of the quotient indicates a travel speed of the vehicle when the vehicle is traveling on level ground and therefore corresponds to an estimate Aw1 of rotational frequency of a driven wheel when the vehicle is traveling on level ground. This is because the travel of a vehicle causes the rotation of driven wheel(s) 3 and, hence, a rotational frequency of a driven wheel can be considered as a travel speed of the vehicle. (The symbol "^" used herein that precedes a reference sign denotes an estimate or an estimated value. This particular symbol "^" may often be omitted. In the figures, this particular symbol "^" can be found on top of other symbol(s).)

The calculator 43c may be configured to calculate a difference between the estimate $\hat{\omega}1$ (rad/s) of rotational frequency of a driven wheel and an actual rotational frequency $\omega1$ (rad/s) of the driven wheel as determined with a rotation sensor 24. The time differentiator 43d may be configured to calculate a time derivative of the difference. The inertia multiplier 43e may be configured to multiply the time derivative with the moment J of inertia to produce the estimate ^Te of external force influence on the drive wheel 2.

Such an estimate ^Te of external force influence corresponds to an estimate of torque that is attributable to external force, which may act on the motor unit 6 when, for example, going up a slope. As can be seen from the illustration of the downstream of the motor unit 6 in FIG. 3, the sum of a torque Te attributable to external force and a wheel torque (i.e., drive wheel torque) Tm attributable to the operation of the motor unit 6 becomes a torque Tmt that is actually applied to the drive wheel 2. Note that the disturbance observer 43 determines an estimate ^Te of such a torque Te attributable to external force.

The motor torque command value Tmr, which may be received by the inertia divider 43a of the disturbance observer 43, is a command value intended to be sent to the power circuitry 28. In particular, the motor torque command value Tmr may be the outcome of subtraction of a correction value Tc calculated by the slip level-responsive corrector 44 from an accelerator signal Tr (i.e., torque command signal) for the corresponding motor unit 6 that may be generated by the torque allocator 48.

The illustrated slip level-responsive corrector 44 includes an external force influence adder 44a, an inertia divider 44b, an integrator 44c, a first calculator 44d, a first amplifier 44e, a time differentiator 44f, a second calculator 44j, a second amplifier 44k, a third calculator 44m, a coefficient multiplier 44n and a correction value subtractor 44p.

In the slip level-responsive corrector 44, the external force influence adder 44a may be configured to add the estimate ^Te of external force influence, as determined by the disturbance observer 43, and the motor torque command value Tmr to produce a sum. Such a sum represents an estimate of the entire torque that may be applied to a drive wheel 2. The inertia divider 44b may be configured to divide the sum, which represents an estimate of the entire torque applied to a drive wheel 2, by the moment J of inertia of the drive wheel that is estimated based on inertia of the vehicle, to produce an estimate $\hat{\bullet\omega}2$ of angular acceleration of the drive wheel 2. (The symbol "•" used herein indicates a derivative. In the figures, this particular symbol "•" can be found on top of other symbol(s).) The integrator 44c may be configured to calculate an integral of the estimate $\hat{\bullet\omega}2$. Such an integral of the estimate $\hat{\bullet\omega}2$ corresponds to an estimate $\hat{\omega}2$ of rotational frequency of the drive wheel when there is no occurrence of slip. The first calculator 44d may be configured to calculate a difference between the estimate $\hat{\omega}2$ (rad/s) of rotational frequency of the drive wheel and an actual rotational frequency $\omega2$ of the drive wheel, as speed difference. The calculated speed difference represents an estimate of slip level of the drive wheel 2. The rotational frequency $\omega2$ of the drive wheel may be obtained based on a detection value produced by a rotation sensor 24.

The time differentiator 44f may be configured to calculate a time derivative of the rotational frequency $\omega2$ of the drive wheel to produce an angular acceleration $\bullet\omega2$ of the drive wheel 2. The second calculator 44j may be configured to calculate a comparison between the angular acceleration $\bullet\omega2$ and the estimate $\hat{\bullet\omega}2$ of angular acceleration of the drive wheel 2 produced by the inertia divider 44b. Such an estimate $\hat{\bullet\omega}2$ of angular acceleration produced by the inertia divider 44b corresponds to an estimate of angular acceleration of the drive wheel 2 when there is no occurrence of slip. Thus, the outcome of comparison calculated by the second calculator 44j indicates an acceleration difference that is attributable to slip.

The first amplifier 44e and the second amplifier 44k may be configured to amplify, with a predefined amplification factor, the speed difference which is the calculation result by the first calculator 44d and the acceleration difference which is the calculation result by the second calculator 44j, respectively. The third calculator 44m may be configured to produce a calculation result of the amplified results.

The coefficient multiplier 44n may be configured to multiply with a tuning coefficient C the calculation result of the amplified speed difference and the amplified acceleration difference, to produce a correction value. The coefficient C may include c1 and c2 in a derivative term. In other words, C=C1+C2 (d/dt).

The correction value subtractor 44p may be configured to subtract the correction value from an accelerator signal Tr that may be generated by the torque allocator 48, to produce a torque command value Tmr. The torque command value Tmr may be sent to the power circuitry 28 assigned to the corresponding motor unit 6 to drive that motor unit 6.

Slip-responsive control according to the aforementioned configuration will now be discussed. Referring to FIG. 3, the disturbance observer 43 may divide a motor torque command value Tmr by a moment J of inertia of the drive wheel 2 to produce a quotient; calculate an integral $\hat{\omega}1$ of the quotient; calculate a difference between the integral $\hat{\omega}1$ and a rotational frequency $\omega1$ of a driven wheel; calculate a time derivative of the difference; and multiply the time derivative with the moment J of inertia. The resulting value corresponds to an estimate $\hat{T}e$ of external force influence on the drive wheel 2.

As discussed earlier, the aforementioned integral $\hat{\omega}1$ of a quotient produced by division of a motor torque command value Tmr by a moment J of inertia of the drive wheel 2 corresponds to an estimate $\hat{\omega}1$ of rotational frequency of a driven wheel when the vehicle is traveling on level ground. Thus, in the configuration under discussion, an estimate $\hat{\omega}1$ of rotational frequency of a driven wheel when the vehicle is traveling on level ground is compared with an actually obtained rotational frequency $\omega1$ of the driven wheel, thereby allowing for providing an estimate $\hat{T}e$ of external force influence that may occur, for example, when going up a slope.

The slip level-responsive corrector 44 may: add the estimate $\hat{T}e$ of external force influence produced by the disturbance observer 43 in the aforementioned manner and the motor torque command value Tmr to produce a sum; divide the sum by the moment J of inertia of the drive wheel that is estimated based on inertia of the vehicle, to produce a quotient; calculate an integral $\hat{\omega}2$ of the quotient; and calculate a difference between the integral $\hat{\omega}2$ and a rotational frequency $\omega2$ of the drive wheel, as speed difference.

The aforementioned integral $\hat{\omega}2$ of the quotient corresponds to an estimate of rotational frequency of the drive wheel when there is no occurrence of slip. Advantageously, the estimate takes external force influence into account. The difference between such an estimate $\hat{\omega}2$ of rotational frequency of the drive wheel and an actually obtained rotational frequency $\omega2$ of the drive wheel 2 corresponds to an estimate of slip level of the drive wheel 2. Such an estimate of slip level advantageously takes external force influence into account, thus being a highly precise estimate.

The time differentiator 44f may calculate a time derivative of the rotational frequency $\omega2$ of the drive wheel to produce an angular acceleration $\bullet\omega2$ of the drive wheel 2. A comparison may be calculated between the angular acceleration $\bullet\omega2$ and an estimate $\hat{\bullet\omega}2$ of angular acceleration of the drive wheel 2 produced by the inertia divider 44b, to produce an acceleration difference.

The first amplifier 44e and the second amplifier 44k may amplify the aforementioned speed difference and the aforementioned acceleration difference, respectively. A calculation result of the amplified results may be produced.

A value that is proportional to an estimate of slip level of the drive wheel 2 calculated in the aforementioned manner, may be subtracted from an accelerator signal Tr, to produce a motor torque command value Tmr. In this way, possible slip of tire(s) can be properly prevented while taking into account external force influence, such as due to winds or vehicle weight when going up a slope, and such prevention of possible slip can be ensured without having to undesirably hinder the travel performance of the vehicle to prevent such slip.

In the embodiment under discussion, correction of an accelerator signal Tr is performed based on both of the speed difference and the acceleration difference. In a variant, correction of an accelerator signal Tr may be performed based on either one of the speed difference and the acceleration difference.

Thus, the disturbance observer 43 may determine an estimate $\hat{T}e$ of external force influence on a drive wheel 2. The slip level-responsive corrector 44 may use the estimate $\hat{T}e$ of external force influence to calculate a correction value that may correspond to slip level of the drive wheel 2, and may correct an accelerator signal Tr to the motor unit 6 with the correction value. In this way, possible slip of tire(s) can be properly prevented while taking into account external force influence, such as due to winds or vehicle weight when going up a slope, and such prevention of possible slip can be ensured without having to undesirably hinder the travel performance of the vehicle to prevent such slip.

A particular configuration that the in-wheel motor drive system 8 may take will now be discussed in connection with FIG. 4 to FIG. 6. The illustrated in-wheel motor drive system 8 includes a wheel bearing unit 4, a motor unit 6 and a reducer unit 7 interposed between the wheel bearing unit 4 and the motor unit 6, in which the hub of a drive wheel 2 supported by the wheel bearing unit 4 is coaxially coupled with a rotational output shaft 74 of the motor unit 6. The illustrated reducer unit 7 includes a cycloidal reducer which includes a rotational input shaft 82 coaxially connected to the rotational output shaft 74 of the motor unit 6. The rotational input shaft 82 has eccentric segments 82a, 82b. The cycloidal reducer also includes curvilinear plates 84a, 84b mounted via respective bearings 85 to the eccentric segments 82a, 82b, in such a way to transmit the eccentric motions of the curvilinear plates 84a, 84b in the form of a rotary motion to the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 includes an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 concurrently serves as a hub for mounting a drive wheel. The illustrated wheel bearing unit 4 includes a double row angular contact ball bearing, in which the rolling elements 55 are in the form of balls rollingly retained by a retainer 56 that is provided one for each row of the balls. The raceway surfaces 53 and 54 have arcuate cross sectional shapes and are formed to have respective contact angles held in back-to-back relation with each other. The outer member 51 and the inner member 52 define an annular bearing space therebetween, and an outboard end of the annular bearing space is sealed by a sealing member 57.

The outer member 51, which serves as a stationary member, is of one piece construction having a flange 51a for attaching to an outboard housing 83b of the reducer unit 7.

The flange 51a has bolt insertion holes 64 formed at a plurality of circumferential locations thereof. The housing 83b has bolt receiving holes 94 that are internally threaded at locations thereof corresponding to the respective bolt insertion holes 64. The outer member 51 can be mounted to the housing 83b by screwing into the bolt receiving holes 94 the mounting bolts 65 that are pre-inserted in the bolt insertion holes 64.

The inner member 52, which serves as a rotational member, includes an outboard member 59 having a hub flange 59a for attaching a wheel. The inner member 52 also includes an inboard member 60 which has an outboard side fitted to an inner periphery of the outboard member 59 and which is crimped to be integrated with the outboard member 59. The outboard member 59 and the inboard member 60 have the corresponding rows of the raceway surfaces 54 formed thereon. The inboard member 60 has a center thereof formed with a through bore 61. The hub flange 59a has force-fitting holes 67 at a plurality of circumferential locations thereof for receiving corresponding hub bolts 66. The outboard member 59 has a cylindrical pilot portion 63 for guiding a drive wheel and brake components (both not shown), which is located in the vicinity of the root of the hub flange 59a of the outboard member 59 and is protruding towards the outboard side. A cap 68 closing an outboard end of the through bore 61 is fitted to an inner periphery of the pilot portion 63.

The illustrated reducer unit 7 includes a cycloidal reducer as described. As shown in FIG. 5, the cycloidal reducer includes two curvilinear plates 84a, 84b, each having an outer contour defined by a smoothly corrugated trochoidal curve, that are mounted via respective bearings 85 to the eccentric segments 82a, 82b of the rotational input shaft 82. A plurality of outer pins 86 are fitted to the housing 83b to directly or indirectly guide, along the outer peripheries thereof, the eccentric motions of the curvilinear plates 84a and 84b. A plurality of inner pins 88, which are fitted to the inboard member 60 of the inner member 52, are inserted to a plurality of corresponding, round through holes 89 formed in each of the curvilinear plates 84a and 84b, to directly or indirectly engage with the through holes 89. The rotational input shaft 82 is splinedly connected to the rotational output shaft 74 of the motor unit 6 for co-rotation. The rotational input shaft 82 is supported on both sides thereof, via two bearings 90, by an inboard housing 83a and by an inner diameter surface of the inboard member 60 of the inner member 52, respectively.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 directly or indirectly engaging with the through holes 89, transmitted in the form of a rotary motion to the inner member 52. The speed of rotation of the inner member 52 is reduced with respect to that of rotation of the rotational output shaft 74. For example, a single-stage reducer unit having such a configuration can achieve a reduction ratio of 1/10 or greater and can also realize a smoother operation. Such a significant reduction ratio allows for the provision of a smaller motor unit 6 that generates rapid rotation, thus enabling weight reduction of the vehicle. In a configuration where a reducer unit comprises a reducer with a significant reduction ratio, such as a cycloidal reducer, the torque generated by a motor unit may be transmitted in correspondingly amplified form to a tire. Thus, in such a configuration, a motor unit may generate a drive torque that has more impact on slip level. Prevention of possible slip according to the present invention can be more effective in such a configuration.

The two curvilinear plates 84a, 84b are mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, are each disposed at a side of the corresponding one of the eccentric segments 82a, 82b, in such a way that the counterweights 91 face each other across the eccentric segments 82a, 82b while each of the counterweights 91 being displaced in a direction opposite to the direction of displacement of the corresponding one of the eccentric segments 82a, 82b. In this way, vibrations that may be caused by the curvilinear plates 84a, 84b can be cancelled out.

Figure 6:
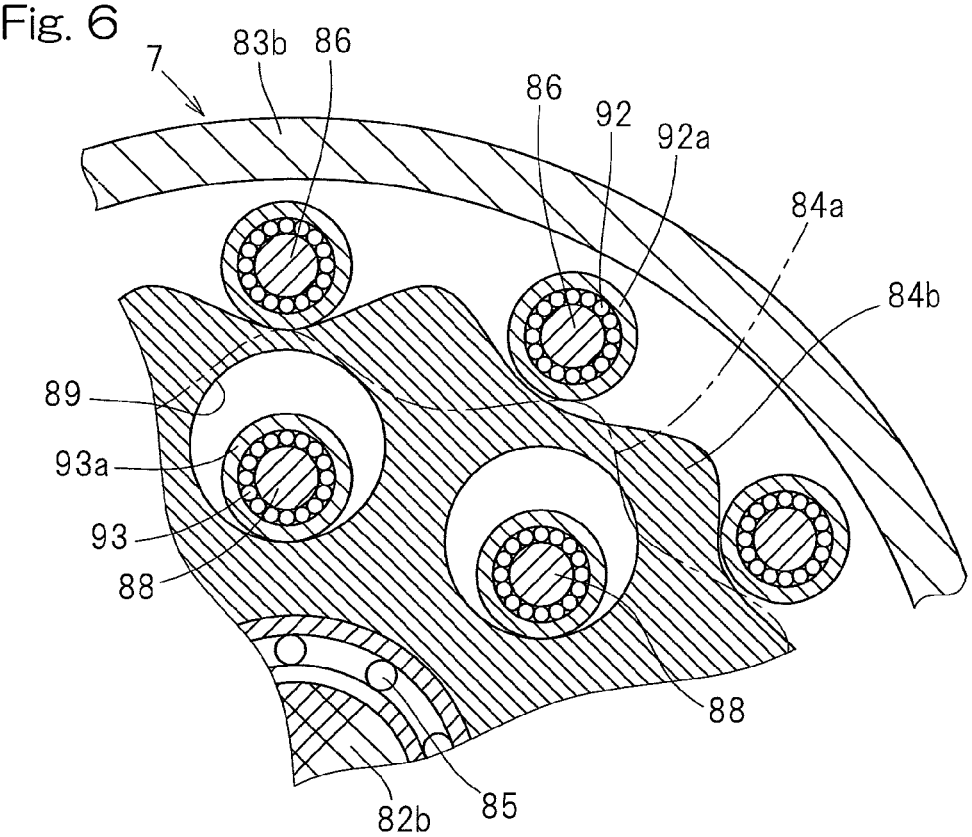
FIG. 6 is a fragmentary enlarged cross sectional view of FIG. 5.

As shown on an enlarged scale in FIG. 6, bearings 92 and bearings 93 may be fitted to the outer pins 86 and the inner pins 88, respectively. The outer rings 92a of the bearings 92 are in rolling contact with the outer peripheries of the curvilinear plates 84a, 84b, while the outer rings 93a of the bearings 93 are in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing for smoother transmission of the eccentric motions of the curvilinear plates 84a, 84b in the form of a rotary motion to the inner member 52.

Figure 4:
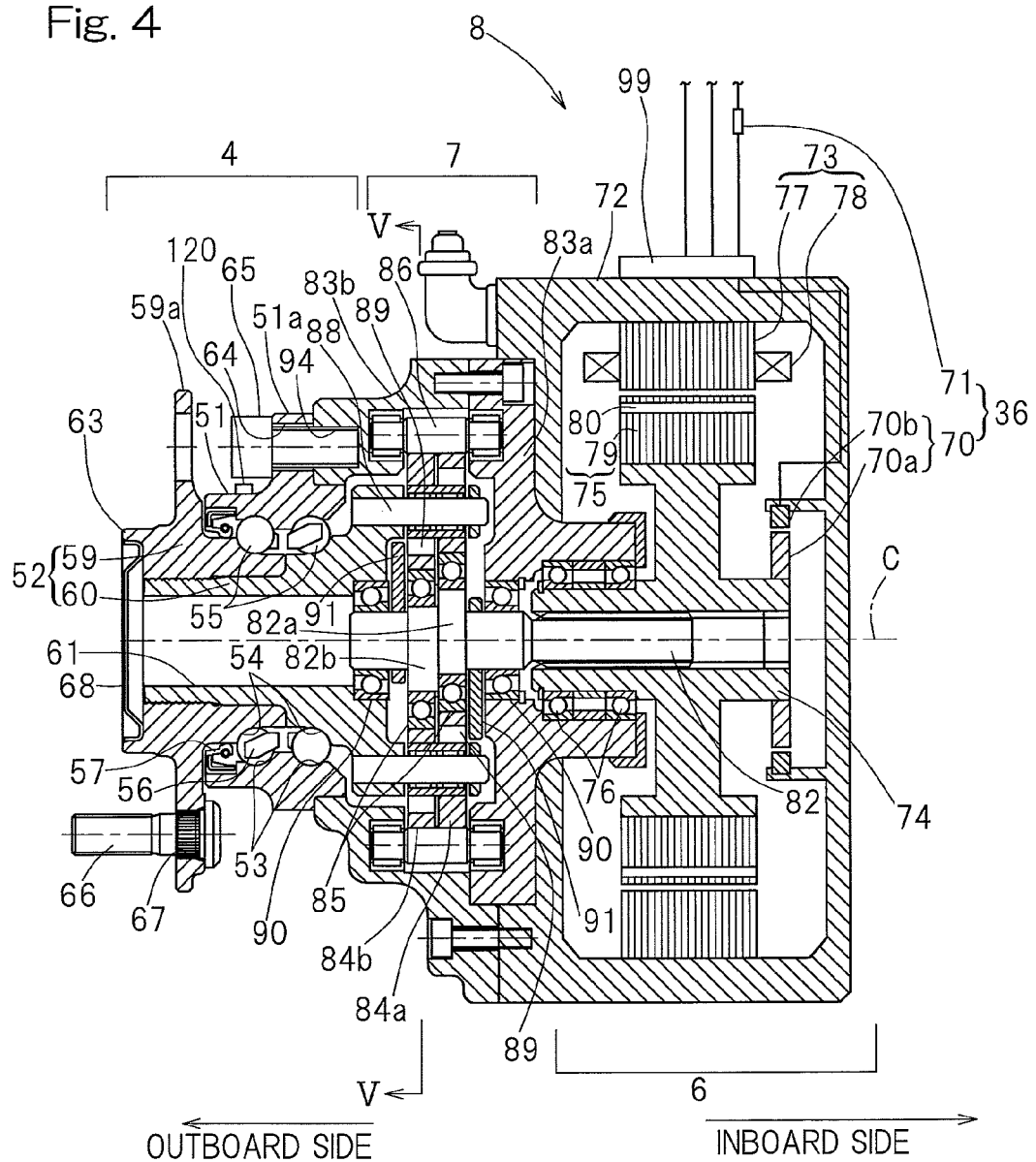
FIG. 4 is a front cut-away view of an in-wheel motor drive system for the electric vehicle.
Figure 5:
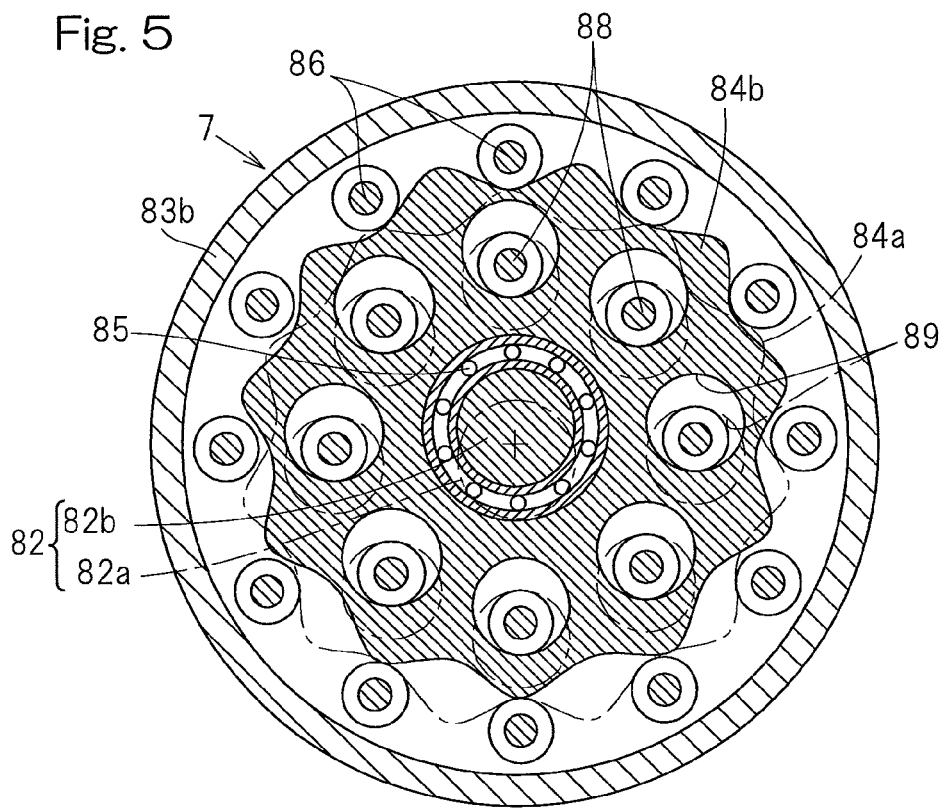
FIG. 5 is a longitudinal cross sectional view of FIG. 4 taken along the line V-V.

As shown in FIG. 4, the motor unit 6 includes a radial-gap type, IPM motor that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 is cantilevered via two bearings 76 to a cylindrical segment of the inboard housing 83a of the reducer unit 7.

The motor stator 73 includes a stator core body 77 made of soft magnetic material and also includes coils 78. An outer peripheral surface of the stator core body 77 is fitted to the inner peripheral surface of the motor housing 72. In this way, the stator core body 77 is supported by the motor housing 72. The motor rotor 75 includes a rotor core body 79 mounted onto the rotational output shaft 74 to be coaxial with the motor stator 73 and also includes a plurality of permanent magnets 80 incorporated in the rotor core body 79.

The motor unit 6 may be associated with an angle sensor 36 configured to sense a rotational angle of the motor rotor 75 relative to the motor stator 73. The angle sensor 36 includes an angle sensor body 70 configured to sense signals representing a rotational angle of the motor rotor 75 relative to the motor stator 73 for output and also includes an angle calculation circuit 71 configured to calculate a rotational angle based on the signals produced from the angle sensor body 70. The angle sensor body 70 includes a detectable element 70a associated with the outer peripheral surface of the rotational output shaft 74 and also includes a detector element 70b associated with the motor housing 72. For example, the detector element 70b may be positioned adjacent the detectable element 70a in a radially opposed fashion. The detectable element 70a and the detector element 70b may be positioned adjacent each other in an axially opposed fashion. Here, the angle sensor 36 may include a magnetic encoder or a resolver. Control of the rotation of the motor unit 6 may be carried out by the aforementioned motor control circuitry 29 (e.g., see FIG. 1 and FIG. 2). To maximize the efficiency of the illustrated motor unit 6, the motor drive controller 33 of the motor control circuitry 29 may be configured to control the timings at which respective phase alternating currents are supplied to the coils 78 of the motor stator 73, based on the rotational angle of the motor rotor 75 relative to the motor stator 73 as sensed by the angle sensor 36.

A connector 99 may be formed at the motor housing 72 for connection of the wires for a motor current in the in-wheel motor drive system 8, wires for various sensors, wires for various commands, and etc.

Figure 7:
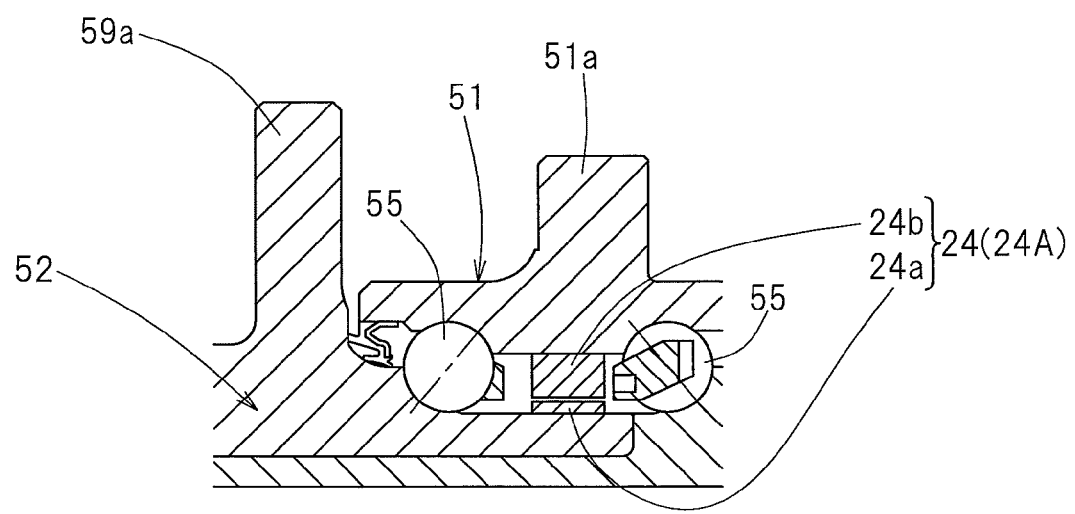
FIG. 7 is a longitudinal cross sectional view of an example of rotation sensor(s) for the electric vehicle.

FIG. 7 illustrates an example of the rotation sensors 24, 24A such as shown in FIG. 1 and FIG. 2. The illustrated rotation sensor 24 or 24A includes a magnetic encoder 24a associated with an outer periphery of the inner member 52 of the wheel bearing unit 4 or 5 and also includes a magnetic sensor 24b associated with the outer member 51 in face-to-face relation with the magnetic encoder 24a. The magnetic encoder 24a may include a ring-shaped member magnetized with N poles and S poles that alternate with each other along a circumferential direction of the ring-shaped member. In the illustrated example, the rotation sensor 24 or 24A is positioned between the double rows of rolling elements 55, 55. In other embodiments, the rotation sensor 24 or 24A may be positioned at an end of the wheel bearing unit 4 or 5.

In the embodiment under discussion such as shown in FIG. 1 and FIG. 2, the inverter unit 22 includes the motor control circuitry 29. In a variant, the ECU 21 which is a primary electronic control unit may include the motor control circuitry 29. Furthermore, in the embodiment under discussion, the ECU 21 and the inverter unit 22 are provided separate from each other. In a variant, the ECU 21 and the inverter unit 22 may be integrated into a single control unit.

As discussed earlier, in an electric vehicle with an in-wheel motor drive system 8, each drive wheel 2 may be driven, independently of other drive wheel(s) 2, with a highly responsive motor unit 6. Thus, the stable travel of such a vehicle may considerably depend on whether appropriate control of the drive wheel(s) 2 can be performed responsively to slip when detected. With the present invention, possible slip of tire(s) can be properly prevented, regardless of, for example, various road conditions, thus effectively preventing a slip of the vehicle itself.

A configuration where the in-wheel motor drive system 8 is at least partly disposed within a drive wheel 2 can reduce the extension of the in-wheel motor drive system 8 along an axis of the corresponding drive wheel 2. A configuration where the in-wheel motor drive system 8 includes a reducer unit 7 configured to transmit to a drive wheel 2 rotation with a speed that is reduced with respect to that of rotation of the motor unit 6 allows for the provision of a smaller motor unit 6.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

[Reference Signs]
1: Vehicle body
2: Drive wheel (Wheel)
3: Driven wheel (Wheel)
4, 5: Wheel bearing unit
6: Motor unit
7: Reducer unit
8: In-wheel motor drive system
9, 10: Electromechanical brake
21: ECU
22: Inverter unit
24, 24A: Rotation sensor
28: Power circuitry
29: Motor control circuitry
30: In-wheel motor unit
31: Inverter
32: PWM driver
33: Motor drive controller
43: Disturbance observer
44: Slip level-responsive corrector

What is claimed is:
1. An electric vehicle comprising:
an in-wheel motor drive system including: a wheel bearing unit rotatably supporting a drive wheel; a motor unit; and a reducer unit interposed between the motor unit and the wheel bearing unit;
a disturbance observer that determines an estimate ˆTe of external force influence on the drive wheel; and
a slip level-responsive corrector that: (i) uses the estimate ˆTe of external force influence to calculate an estimate of torque applied to the drive wheel, an estimate ˆω2 of rotational frequency of the drive wheel, and an estimate ˆ•ω of rotational angular acceleration of the drive wheel; (ii) determines an estimate of slip level of a tire based on comparison between the estimate ˆω2 and an actual rotational frequency ω2 of the drive wheel and comparison between the estimate ˆ•ω and an actual rotational angular acceleration •ω2 of the drive wheel; (iii) calculates a correction value Tc based on the estimate of slip level; and (iv) corrects an accelerator signal Tr to the motor unit with the correction value Tc to produce a motor torque command value Tmr;
the disturbance observer being configured to: (a) divide the motor torque command value Tmr by a moment J of inertia of the drive wheel that is estimated based on inertia of the vehicle, to produce a quotient; (b) calculate an integral of the quotient; (c) calculate a difference between the integral and a rotational frequency ω1 of a driven wheel; (d) calculate a time derivative of the difference; and (e) multiply the time derivative with the moment J of inertia to produce the estimate ˆTe of external force influence on the drive wheel,
the slip level-responsive corrector being configured to: (a) add the estimate ˆTe of external force influence and the motor torque command value Tmr to produce a sum; (b) divide the sum by the moment J of inertia of the drive wheel that is estimated based on inertia of the vehicle, to produce a quotient; (c) calculate an integral of the quotient; and (d) calculate a difference between the integral and a rotational frequency ω2 of the drive wheel, as speed difference, or being configured to: (a) add the estimate ˆTe of external force influence and the motor torque command value Tmr to produce a sum; (b) divide the sum by the moment J of inertia of the drive wheel that is estimated based on inertia of the vehicle, to produce a quotient; (e) calculate a difference between the quotient and a time derivative of a rotational frequency ω2 of the drive wheel, as acceleration difference,
the slip level-responsive corrector being further configured to subtract from the accelerator signal Tr, a signal that is proportional to the speed difference, a signal that is proportional to the acceleration difference, or a signal that is proportional to a value equal to one of the speed difference and the acceleration difference as corrected with the other of the speed difference and the acceleration difference, to produce the motor torque command value Tmr.

2. The electric vehicle as claimed in claim 1, wherein the in-wheel motor drive system is partly or entirely disposed within the drive wheel and includes the motor unit and the wheel bearing unit.

3. The electric vehicle as claimed in claim 2, wherein the in-wheel motor drive system also includes the reducer unit configured to transmit to the drive wheel rotation with a speed that is reduced with respect to that of rotation of the motor unit.

4. The electric vehicle as claimed in claim 1, wherein the reducer unit comprises a cycloidal reducer.

* * * * *